UNITED STATES PATENT OFFICE.

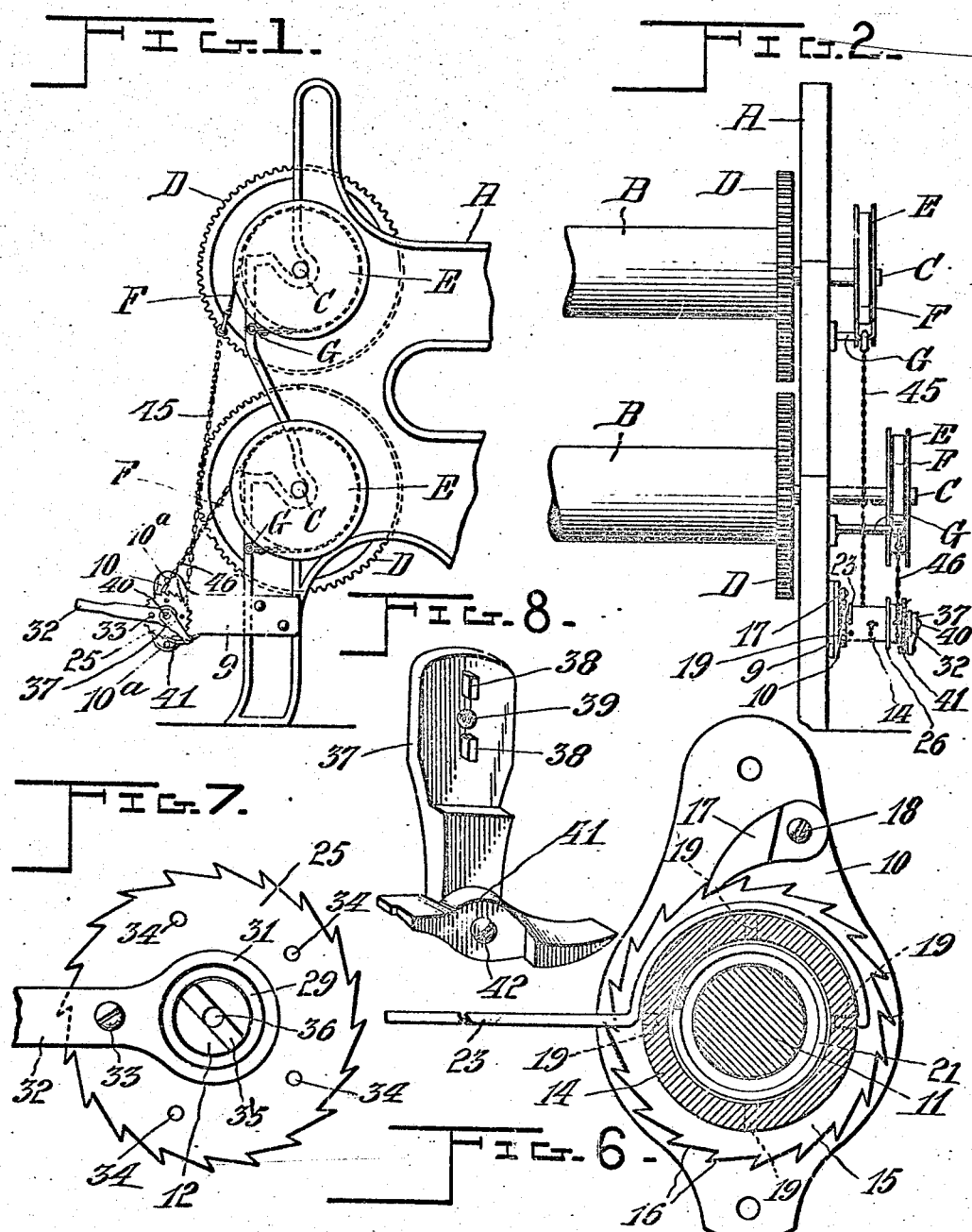

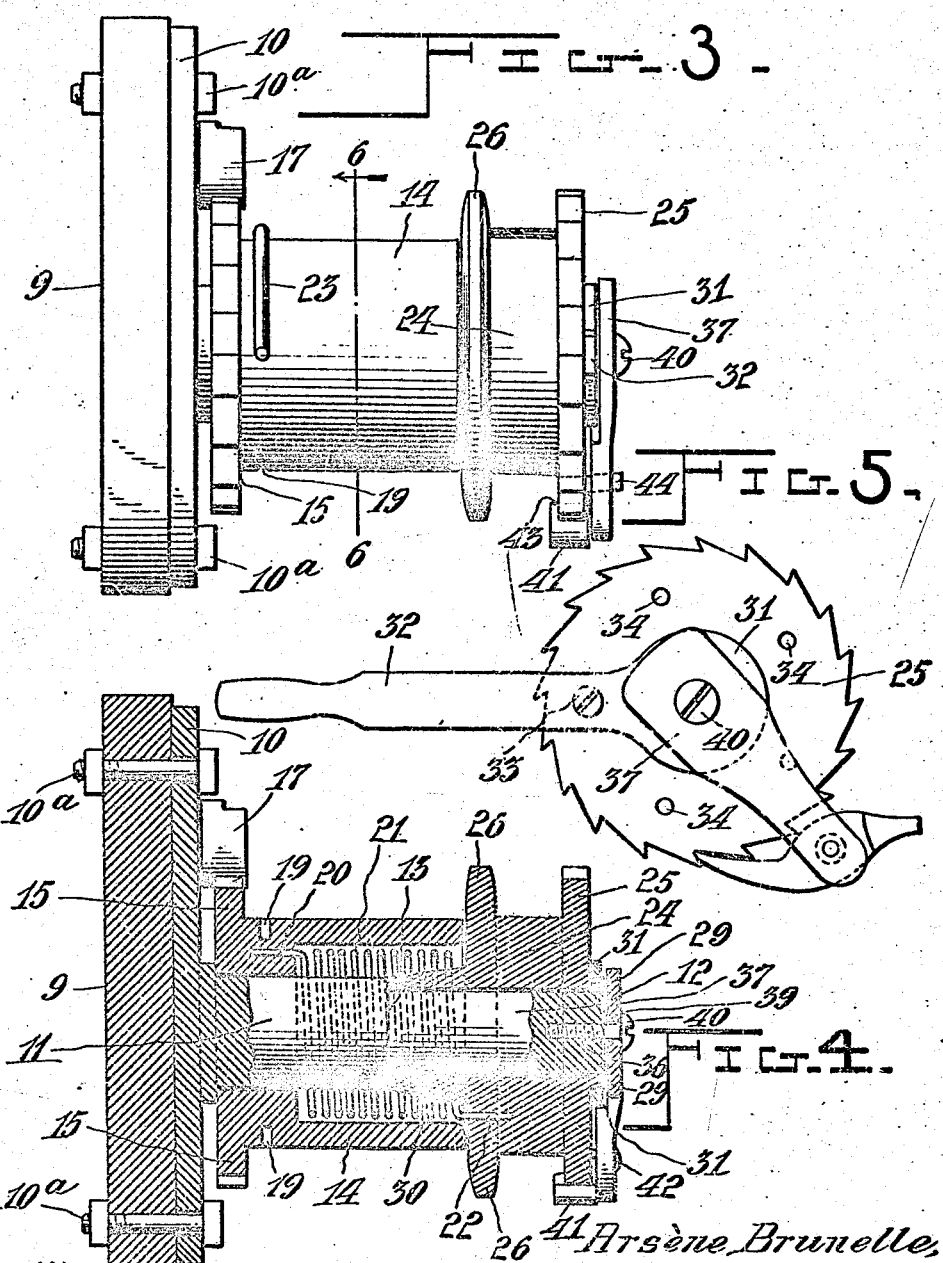

ARSÈNE BRUNELLE, OF MANVILLE, RHODE ISLAND.

TENSIONING DEVICE FOR WARP-BEAMS, &c.

No. 895,001.     Specification of Letters Patent.     Patented Aug. 4, 1908.

Application filed August 18, 1905. Serial No. 274,840.

*To all whom it may concern:*

Be it known that I, ARSÈNE BRUNELLE, a citizen of the United States, residing at Manville, in the county of Providence, State of Rhode Island, United States of America, have invented certain new and useful Improvements in Tensioning Devices for Warp-Beams, &c.; and I do hereby declare that the following is a full, clear, and exact description of the invention, such as will enable others skilled in the art to which it appertains to make and use the same.

My invention relates to tensioning devices, and it consists in the constructions, combinations and arrangements herein described and claimed.

An object of my invention is to provide a device having a pair of rotatable members, or drums, for independent attachment to two friction bands, and a common tension member connected to said drums, whereby the tension on said friction bands can be adjusted by either the conjoint or independent rotation of said drums.

In the accompanying drawings, forming a part of this application and in which similar reference symbols indicate corresponding parts in the several views:—Figure 1 is a side elevation, illustrating one embodiment of my invention applied to a loom; Fig. 2 is a rear elevation of the parts shown in Fig. 1; Fig. 3 is a rear elevation, on a larger scale, of the tensioning device shown in Fig. 2; Fig. 4 is a vertical longitudinal section of the construction shown in Fig. 3; Fig. 5 is an elevation of the right hand end of Fig. 3; Fig. 6 is a sectional view on the line 6—6 of Fig. 3; Fig. 7 is a view similar to Fig. 5, with the pawl and its plate removed; and Fig. 8 is a perspective view of the pawl and plate shown in Fig. 5.

Referring to the drawings, A indicates any usual frame on which are rotatably supported the beams B provided with driving gears D. The beams carry spindles C which have secured at their outer ends friction pulleys E. Friction bands F, secured to the frame at G, extend in any usual manner about the respective pulleys E and have their free ends secured by chains to independent tensioning members hereinafter described.

A plate 10, carrying a spindle 11, is secured by bolts 10ª to a bracket 9 on the frame; said spindle being provided with an annular shoulder 13 and a reduced portion 12 extending therefrom.

Two independent members 14 and 24 are rotatably mounted on the spindle 11; the member 24 being provided with an annular flange 30 for engaging the shoulder 13 of the spindle to properly space said members.

A helical spring 21 has its ends 20 and 22 secured, respectively, to the independently rotatable members 14 and 24; whereby the tension of said spring can be adjusted by rotating either of said members.

The member 14 is provided with a toothed annular flange 15, for engagement by a gravity actuated pawl 17 to lock said member against rotation under the tension of the spring 21.

The member 24 is provided with a corresponding toothed annular flange 25, for engagement by a pawl 41 to lock said member against rotation under the tension of the spring 21. As shown especially in Fig. 8, the pawl 41 is pivotally carried at 42 by a plate 37 provided with lugs 38 adapted to fit a slot 35 in the end of the spindle 11; said plate being secured in position by a screw 40 extending through an opening 39 in said plate and threaded into an opening 36 in the spindle.

The members 14 and 24 constitute drums for the attachment, respectively, of chains 45 and 46 connected to the friction bands F of the friction pulleys E.

The drum 24 is provided with an annular flange 29 for rotatably supporting a member 31 provided with an arm 32; said arm being shown provided with a screw stop 33 adapted to engage openings 34 in the drum 24 for manually rotating said drum to adjust the spring 21. The drum 14 is shown provided with spanner and recesses 19, to provide convenient means for rotating said drum by a spanner wrench 23 to adjust the tension of the spring 21.

From the above description, it will be clear that the friction exerted by the bands F on the friction pulleys E secured to the spindles C can be efficiently and conveniently regulated by rotating either of the independently rotatable members 14 or 24 to adjust the tension of the spring 21.

I have illustrated and described a preferred and satisfactory construction, but, obviously, changes could be made within the spirit and scope of my invention.

From the preceding detailed description it will be clear that when the chain 45 is wound up by the drum 14 and spring 21, it will increase the friction of the strap F on the pulley E, thus tensioning one of the beams B, and that when the chain is allowed to slacken and unwind, the reverse will take place and the tension will be removed from the beam. Of course the same is true of the tensioning of the other beam through the chain 46, the drum 24 and the remaining strap F.

Having thus described my invention, what I claim as new therein and desire to secure by Letters Patent is:—

1. A tensioning device for friction bands comprising a pair of rotatable members constituting attachments for the ends of independent friction bands, a common tension member connected to said rotatable members and tending to rotate the latter, and detachable means for locking said rotatable members against rotation under the action of said tension member, substantially as described.

2. A tensioning device for friction bands comprising a pair of rotatable drums constituting attachments for the ends of independent friction bands, a spring connected to said drums and tending to rotate the latter, and means detachably engaging said drums for locking them against rotation under the action of said spring, substantially as described.

3. A tensioning device for friction bands comprising a spindle, a pair of drums rotatably mounted thereon and constituting attachments for the ends of independent friction bands, a spring connected to said drums and tending to rotate them in opposite directions, and means for locking said drums against rotation under the action of said spring, substantially as described.

4. A tensioning device for friction bands comprising a spindle, a pair of drums rotatably mounted thereon and constituting attachments for the ends of independent friction bands, a spring connected to said drums and tending to rotate them in opposite directions, means for independently rotating either of said drums for adjusting the tension of said spring, and detachable means engaging said drums for locking them against rotation under the action of said spring, substantially as described.

5. A tensioning device for friction bands comprising a spindle, a pair of drums rotatably mounted thereon and constituting attachments for the ends of independent friction bands, a shoulder on said spindle for axially spacing said drums, a spring connected to said drums and tending to rotate them in opposite directions, means for independently rotating either of said drums for adjusting the tension of said spring, and detachable means engaging said drums for locking them against rotation under the action of said spring, substantially as described.

6. A tensioning device for friction bands comprising a spindle, a pair of drums rotatably mounted thereon and constituting attachments for the ends of independent friction bands, one of said drums being provided with an enlarged bore throughout a portion of its length, a spring mounted in said enlarged bore and connected at its respective ends to said two drums and tending to rotate the latter, and means for locking said drums against rotation under the action of said spring, substantially as described.

7. A tensioning device for friction bands comprising a spindle, a drum rotatably mounted on said spindle and constituting an attachment for the end of a friction band, said drum being provided with an enlarged bore throughout a portion of its length, a shoulder on said spindle, a second drum rotatably mounted on said spindle and provided with a flange engaging said shoulder, a spring mounted in said enlarged bore and connected at its respective ends to said two drums, and tending to rotate the latter, and means for locking said drums against rotation under the action of said spring, substantially as described.

8. A tensioning device for friction bands comprising a spindle, a pair of drums rotatably mounted thereon and constituting attachments for the ends of independent friction bands, one of said drums being provided with an enlarged bore throughout a portion of its length, a spring mounted in said enlarged bore and connected at its respective ends to said two drums and tending to rotate the latter, means for locking said drums against rotation under the action of said spring, and means for independently rotating either of said drums to adjust the tension of said spring, substantially as described.

In witness whereof I have hereunto set my hand in the presence of two witnesses.

ARSÈNE BRUNELLE.

Witnesses:
GEORGE PINSONNEAULT,
JOHN B. DELISLE.